Patented Sept. 25, 1951

2,568,778

UNITED STATES PATENT OFFICE 2,568,778

TERTIARY-AMINOALKYL-ALPHA-ARYL-ALPHA-(4-QUINOLYL)ACETATES AND AMIDES AND THEIR PREPARATION

Alexander R. Surrey, Albany County, and Royal A. Cutler, Rensselaer County, N. Y., assignors to Sterling Drug Inc., Wilmington, Del., a corporation of Delaware No Drawing. Application May 28, 1948, Serial No. 29,937

20 Claims. (Cl. 260—287)

This invention relates to quinoline compounds and to processes of preparing the same.

More particularly, this invention relates to basic alpha-aryl-alpha-(4-quinolyl)acetic acid esters and amides, to addition salts thereof, to intermediates therefor, and to processes of preparing said basic compounds and intermediates therefor.

More particularly the basic compounds of this invention are those having the formula

QCH(A)COYXB where Q is a 4-quinolyl radical, A is an aryl radical, Y is O, NH or N-(lower alkyl), X is a lower alkylene radical, and B is a lower aliphatic tertiary-amino radical. These compounds are of interest as pharmaceutical agents.

In the above formula the lower aliphatic tertiary-amino radical, designated as B, comprehends lower dialkylamino radicals illustrated by such examples as dimethylamino, diethylamino, ethylmethylamino, di-n-butylamino, and the like; and lower saturated N-heterocyclic groups illustrated by examples such as 1-piperidyl, 3-methyl-1-piperidyl, 1-pyrrolidyl, 4-morpholinyl, 2,6-dimethyl-1-piperidyl, and the like. It follows that BH designates a lower aliphatic secondary-amine as illustrated by diethylamine, di-n-butylamine, morpholine, 2-methyl-1-piperidine, and the like. The lower alkylene group, designated as X, preferably contains 2–6 carbon atoms, and includes such examples as

—CH₂CH₂—, —CH₂CH₂CH₂—, —CH₂CH₂CH₂CH₂—,

—CH₂CH₂CH₂CH₂CH₂CH₂—, —ĊH(CH₃), —ĊH(C₂H₅),

—Ċ(CH₃)₂, —CH(CH₃)ĊH(CH₃), —CH₂ĊH(CH₃),

—CH(CH₃)CH₂—, —CH₂ĊH(C₂H₅), —CHCH₂ĊH(CH₃),

—CH₂CH₂CH₂ĊH(CH₃), —CH₂CH₂OCH₂CH₂—,

—CH₂CH₂CH₂SCH₂CH₂— and the like. It follows that B—X— designates a lower aliphatic tertiary-aminoalkyl radical where B and X have the meanings hereinabove described. Examples of such lower aliphatic tertiary-aminoalkyl radicals include 2-dimethylamino-1-propyl, 2-diethylaminoethyl, 2-(ethylmethylamino)ethyl, 3-(di-n-butylamino)propyl, 4-(1-piperidyl)butyl, 5-(2-methyl-1-piperidyl)-2-pentyl, 2-(1-pyrrolidyl)-ethyl, 3-(4-morpholinyl)propyl, 2-(2-diethylaminoethoxy)ethyl, 2-(3-dimethylaminopropylmercapto)ethyl, and the like.

The aryl radical, designated as A, is one of preferably 6–10 carbon atoms. The aryl radical can be substituted by such groups as hydroxyl; alkoxyl such as methoxyl, ethoxyl, etc.; dialkylamino such as dimethylamino; halogen such as chloro, bromo, or iodo; lower alkyl such as methyl, ethyl, butyl, etc.; and other groups which the chemist appreciates will be unaffected by the reaction conditions used in the preparation of the basic compounds of our invention.

It is to be understood that the term "a 4-quinolyl radical" (designated as Q) as used in this specification and in the appended claims is generic, and includes 4-quinolyl radicals wherein the quinoline nucleus may be substituted by one or more of such groups as: halo, including chloro, bromo, iodo, and fluoro; lower alkyl, including methyl, ethyl, propyl, amyl, and the like; hydroxy; lower alkoxy, including methoxy, ethoxy, propoxy, and the like; aryloxy, such as phenoxy; aralkoxy, such as benzyloxy; trihaloalkyl, such as trifluoromethyl; nitro; amino; substituted-amino, such as acetylamino, ethylamino, dimethylamino, benzylamino, and the like; and other substituents.

As illustrative of our invention the following specific compounds are presented:

1. 2-di-n-butylaminoethyl alpha-(3-ethoxyphenyl)-alpha-(6-methoxy-4-quinolyl)acetate,

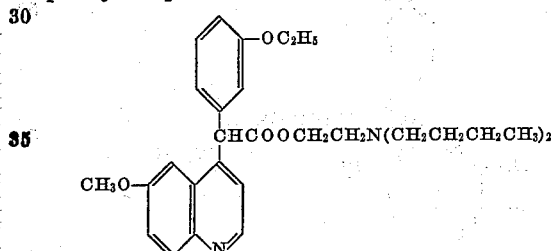

2. 3-(1-piperidyl)propyl alpha-(3,4-dichlorophenyl)-alpha-(6,8-dichloro-4-quinolyl)acetate,

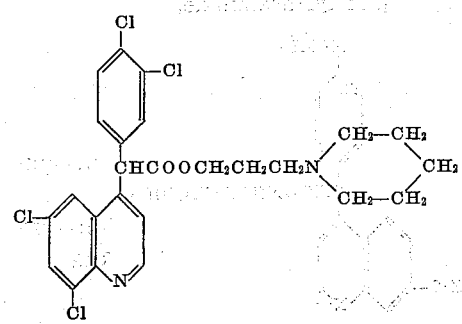

3. 4-dimethylaminobutyl alpha-phenyl-alpha-(4-quinolyl)-acetate,

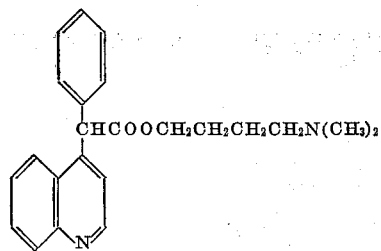

4. 5-diethylamino-2-pentyl alpha-(3,4-dimethoxyphenyl)-alpha-(3-methyl-8-iodo-4-quinolyl) acetate,

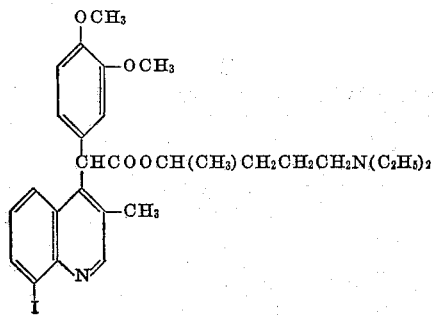

5. 3-(2-methyl-1-piperidyl)propyl alpha-phenyl-alpha-(3-nitro-4-quinolyl)acetate,

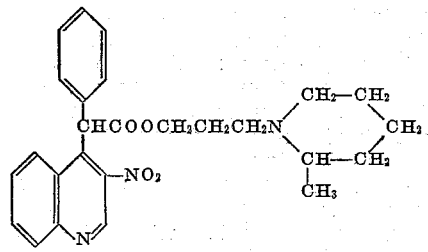

6. N-(2-(4-morpholinyl)ethyl)-alpha-(4-methylphenyl)-alpha-(3,6,7-trimethyl-4-quinolyl) acetamide,

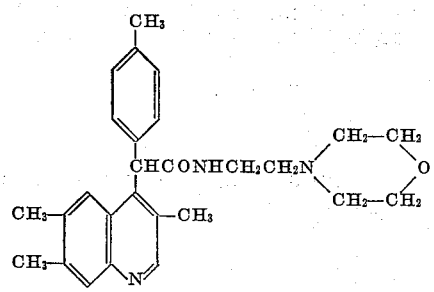

7. N-(3-(2-methyl-1-pyrrolidyl)propyl)-alpha-(4-dimethylaminophenyl)-alpha-(7-phenoxy-4-quinolyl) acetamide,

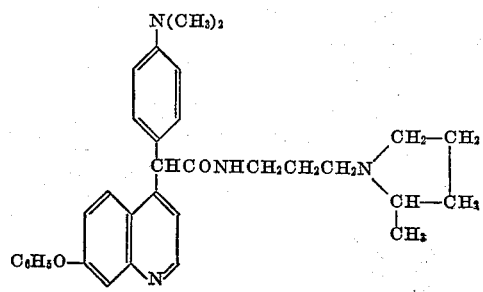

8. N-ethyl-N-(2-dimethylaminoethyl)-alpha-phenyl-alpha-(7-chloro-4-quinolyl) acetamide,

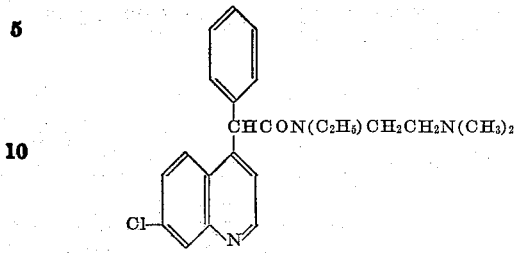

Our invention further comprehends processes for preparing the above compounds. These processes are presented in the following chart, wherein Q, A, Y, X and B have the meanings hereinabove specified, Z stands for halogen, and R stands for H or lower alkyl.

CHART I

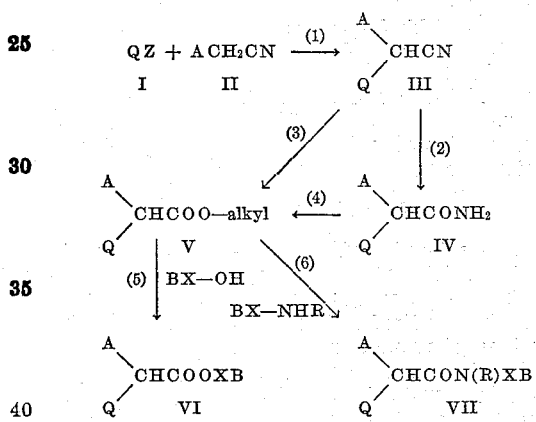

Step (1) of Chart I involves the condensation of a 4-haloquinoline (I) with an arylacetonitrile (II) in the presence of a strong base to yield an alpha-aryl-alpha-(4-quinolyl)acetonitrile (III). For example, alpha-phenyl-alpha-(5-chloro-4-quinolyl)acetonitrile is prepared by condensing phenylacetonitrile with 4,5-dichloroquinoline in the presence of sodium amide. Other basic condensation agents, e. g. potassium amide, sodium hydride, phenyllithium, and the like, can be used in place of sodium amide. We prefer to use sodium amide as the base because of its availability and low cost. We found that excellent results were obtained in this condensation when about two moles of sodium amide and two moles of arylacetonitrile were employed per one mole of 4-haloquinoline in benzene as the solvent with the reaction temperature being kept below 35° C. The condensation can also be run using other ratios of reactants, or higher reaction temperatures, but with a sacrifice in yields. Further, solvents other than benzene, such as toluene, xylene, ether, dioxane, and the like can be used.

The intermediate 4-haloquinolines (I) are generally well known to those skilled in the art; for representative literature references see: Surrey et al., J. Am. Chem. Soc. 68, 113, 1244, and 2570 (1946); Steck et al., ibid. 129, 132, 380, and 1241 (1946); Riegel et al., ibid. 1229; Baker et al., ibid. 1267; Mosher et al., ibid. 69, 303 (1947); Bachman et al., ibid. 365; Snyder et al., ibid 371; and Clinton et al., ibid. 704. Some 4-haloquinolines that are useful intermediates in the preparation of the compounds of our invention are listed as follows:

3,4-dichloroquinoline
3,4,5-trichloroquinoline
3,4,7-trichloroquinoline
3-bromo-4-chloroquinoline
3-bromo-4,7-dichloroquinoline
3-iodo-4-chloroquinoline
3-iodo-4,5-dichloroquinoline
4,5,6-trichloroquinoline
4,5,7-trichloroquinoline
4,6,8-trichloroquinoline
4,7,8-trichloroquinoline
4-chloro-5,7-dibromoquinoline
3-methyl-4-chloro-7-iodoquinoline
3-methyl-4-chloro-8-iodoquinoline
3-methyl-4,5-dichloroquinoline
3-methyl-4,7-dichloroquinoline
3-methyl-4-chloro-7-bromoquinoline
3-methyl-4-chloro-6-bromoquinoline
3-methyl-4-chloro-6-ethoxyquinoline
3,6-dimethyl-4-chloroquinoline
3-methyl-4,8-dichloroquinoline
6-methyl-4-chloro-8-methoxyquinoline
3,8-dimethyl-4-chloroquinoline
4,7-dichloroquinoline
4-chloro-7-bromoquinoline
4-chloro-7-iodoquinoline
4,7-dichloro-6-methoxyquinoline
4,5-dichloroquinoline
3-nitro-4-chloroquinoline
3-amino-4-chloroquinoline
4-chloro-7-fluoroquinoline
4-chloro-7-trifluoromethylquinoline
4,7-dichloro-5-methoxyquinoline
4-chloro-7-phenoxyquinoline
3,4-dibromoquinoline
4-chloro-6-nitroquinoline The alpha-aryl-alpha-(4-quinolyl)acetonitrile (III) can be hydrolyzed, through step (2) of Chart I, to an alpha-aryl-alpha-(4-quinolyl) acetamide (IV) or, through step (3), to a lower alkyl alpha-aryl-alpha-(4-quinolyl)-acetate (V).

Step (2) can be carried out by various means. We found that quantitative yields of amide, IV, were obtained by allowing a concentrated sulfuric acid solution of the nitrile, III, to stand overnight at room temperature. The amide, IV, is also formed when the nitrile, III, is refluxed with aqueous potassium hydroxide or with sodium hydroxide in about 70% ethanol. Further, quantitative yields of the amide, IV, are obtained when a solution of the nitrile, III, in absolute methanol is treated at room temperature for about six hours with dry hydrogen chloride. The same results are obtained by substituting for absolute methanol, dry chloroform containing absolute ethanol, and then, after the treatment with hydrogen chloride, allowing the resulting solution to stand for three days. The reaction using absolute methanol as the solvent can be carried out at refluxing temperature, however the yield of amide, IV, is low. As a specific illustration of step (2), alpha-(4-methoxyphenyl)-alpha-(6-methoxy-4-quinolyl)acetonitrile is hydrolyzed to alpha-(4-methoxyphenyl)-alpha-(6-methoxy-4-quinolyl)acetamide.

The alcoholysis of the nitrile, III, to the lower alkyl ester, V, designated as step (3) in Chart I, was found, in our hands, not to take place under ordinary conditions customary for conversion of nitriles to esters. For example, phenylacetonitrile is converted in good yield to ethyl phenyl acetate by refluxing the nitrile for three hours with concentrated sulfuric acid in absolute ethanol ("Reactions of Organic Compounds," Hickinbottom, page 251, Longmans, 1945). However, when the same conditions are applied in an attempted hydrolysis of alpha-phenyl-alpha-(7-chloro-4-quinolyl)acetonitrile, most of the starting nitrile is recovered after refluxing for four hours. Refluxing this same nitrile for about twenty-two hours with concentrated sulfuric acid and ethanol results in a quantitative yield of 7-chloro-4-benzylquinoline. Repetition of the latter experiment at lower temperatures (30-50° C.) for about twenty-two hours gives only unchanged nitrile. The same results are obtained by allowing the solution of the nitrile, sulfuric acid, and ethanol to stand for six weeks at room temperature.

Ethyl 4-quinolylacetate has been prepared in good yield by refluxing 4-quinolylacetonitrile in absolute ethanol for four hours while passing dry hydrogen chloride through the solution (Borsche and Butschli, Ann. 529, 266 (1937)). A similar procedure applied to alpha-phenyl-alpha-(7-chloro-4-quinolyl)acetonitrile, using methanol as the solvent, yields a small amount of the corresponding amide plus the unchanged nitrile. Increasing the reflux period to eight hours and using ethanol as the solvent gives principally 7-chloro-4-benzylquinoline.

We did have success in performing step (3) by using hydrogen chloride in aqueous-alcoholic media at lower temperatures. Thus, as an illustrative case, alpha-phenyl-alpha-(7-chloro-4-quinolyl)acetonitrile, is added to a cooled, previously saturated hydrogen chloride solution of one part water in three parts of ethanol. The passage of hydrogen chloride through the solution is continued for five or six hours at room temperature and the reaction mixture allowed to stand for varying lengths of time. In each of these experiments some of the corresponding amide is obtained together with some of the corresponding ethyl ester, the amount of amide varying inversely with the length of time of standing. For example, four hours of standing yields 20-30% of the ester, and the remainder consisting of the amide; three days of standing gives 40% of the ester and two weeks, 70%.

Step (4) of Chart I is carried out successfully employing conditions found satisfactory in executing step (3). Thus, under such conditions using a standing period of about three weeks and methanol as the alcohol, a 56% yield of methyl alpha - phenyl - alpha - (7-chloro-4-quinolyl)-acetate is obtained from the corresponding disubstituted-acetamide.

The alkyl alpha-aryl-alpha-(4-quinolyl) acetate, V in Chart I, can be converted, by step (5), into the corresponding tertiary-aminoalkyl esters or, by step (6), into the corresponding N-(tertiary-aminoalkyl) amides. The basic esters, VI, are formed when V is treated with a lower aliphatic tertiary-aminoalkanol, designated as BXOH, where BX— is a lower aliphatic-tertiary-aminoalkyl radical as described hereinabove; and the basic amides, VII, are obtained when V is treated with a lower aliphatic tertiary-aminoalkylamine, designated as BXNHR, where R is H or lower alkyl. As specific illustrations, 3-(1-piperidyl)-propyl alpha-phenyl-alpha-(5-chloro-4-quinolyl)acetate is formed when the corresponding lower alkyl (preferably methyl or ethyl) ester is treated with 3-(1-piperidyl)propanol; N-

(2-(4-morpholinyl)ethyl) - alpha-phenyl-alpha-(4-quinolyl)acetamide is formed by treating the corresponding lower alkyl ester with 2-(4-morpholinyl)-ethylamine; N - methyl-N-(2-diethylaminoethyl)-alpha-phenyl-alpha-(7 - chloro - 4-quinolyl)acetamide is obtained from the corresponding lower alkyl ester and N,N-diethyl-N'-methyl-1,2-ethylenediamine.

In addition, our invention comprehends a method of preparing 4-(arylmethyl)quinolines of the general formula QCH₂A, where Q and A have the meanings specified above. This method involves removal of the CN group of compounds having the formula, ACH(Q)CN (III in Chart I), the removal taking place in two steps, namely: the hydrolysis of the nitrile group to a carboxyl group, and the elimination of carbon dioxide from the molecule. Quantitative yields are obtained under various conditions: e. g. by refluxing the nitrile, III, with about 60% aqueous sulfuric acid for about one hour; or by refluxing the nitrile with concentrated sulfuric acid in ethanol for about twenty-two hours; or by refluxing the nitrile in absolute ethanol for about eight hours while passing dry hydrogen chloride through the solution. Such treatment of alpha-phenyl-alpha-(4-quinolyl)-acetonitrile yields 4-benzylquinoline. This compound, 4-benzylquinoline, has been reported in the literature, however, the methods of preparing it have been far from being satisfactory. It was first prepared by Rabe and Pasternack (Ber. 46, 1029 (1913)), who isolated it as a by-product from the action of benzylmagnesium chloride on 4-cyanoquinoline. Bergman and Rosenthal (J. prakt. Chem. 135, 275 (1932)) obtained it in small yield from the action of benzylmagnesium chloride on quinoline, 2-benzylquinoline being the main product. In addition, Bergstrom (J. Org. Chem. 11, 55 (1946)) reported its preparation in 37% yield by the action of chlorobenzene on lepidine in the presence of potassium amide in liquid ammonia. Now, by our above-described method, it is possible to obtain this compound, as well as other 4-arylmethylquinolines, in excellent yields.

Also encompassed within the scope of our invention are salts of the basic compounds, VI and VII, derived from non-toxic inorganic or organic acids. Among the acids which may be employed to form the salts are hydrochloric acid, phosphoric acid, sulfuric acid, sulfamic acid, tartaric acid, citric acid, benzoic acid, and the like. Also included in our invention are quaternary salts of these basic esters and amides (VI and VII) derived from esters of inorganic acids, such as methyl iodide, ethyl bromide, benzyl chloride, and the like.

The following examples will further illustrate specific embodiments of our invention.

EXAMPLES

I. Alpha-aryl-alpha-(4-quinolyl)acetonitriles

The intermediate alpha-aryl-alpha-(4-quinolyl)acetonitriles designated as III in Chart I are prepared by condensing a 4-haloquinoline with an arylacetonitrile in the presence of a strong base. The following procedure where aryl is phenyl is illustrative of this method: 110 g. (2.6 moles) of sodium amide is added to a well stirred, ice-cooled solution of 260 g. (2.2 moles) of phenylacetonitrile in one liter of dry benzene contained in a flask fitted with a soda-lime tube. The temperature rises gradually to 35° C. with the color of the solution changing from a pale yellow to a deep reddish-black. After stirring for an hour, one mole of the 4-haloquinoline (preferably where halo is chloro because of ease of preparation) is added in small portions at a rate sufficient to maintain the temperature at 25–30° C. with strong external cooling. After the addition has been complete, the ice bath is removed and the reaction mixture stirred at room temperature for two hours. The bright red sodium salt of the product and unchanged sodium amide are decomposed by the cautious dropwise addition of water. The light reddish-orange benzene layer is washed once with water followed by extraction with dilute hydrochloric acid. Ice is added to the acid extracts and the free base liberated by the addition of concentrated ammonium hydroxide. In some preparations the product separates as a solid at this stage and is collected by filtration. In other preparations the free base separates as an oil which is taken up in an appropriate solvent such as chloroform, and the resulting solution dried over anhydrous calcium sulfate. Removal of the solvent by distillation yields a viscous oil which, on triturating with a solvent such as ether, solidifies in most instances. When such treatment does not yield a solid, the oil is distilled in vacuo, and the resulting distillate crystallizes when triturated with a solvent such as a mixture of ether and n-pentane. The crude solids are obtained in practically quantitative yields and are used in subsequent reactions without further purification. Analytical samples are obtained by recrystallization from petroleum ether.

Compounds prepared in this manner include those having the formula:

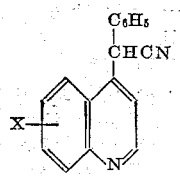

where X has the following meanings:

| X | M. P., ° C. |
|---|---|
| H[1] | 86 – 86.5 |
| 5-Cl[2] | 149.5–150.5 |
| 7-Cl[3] | 117.5–118.5 |

[1] Crude oil after removal of chloroform is distilled at 0.1 micron, B. P. 140° C. Distillate crystallizes from mixture of n-pentane and ether.
[2] Crude product separates as a pale yellow solid on addition of concentrated ammonium hydroxide to acidic extract.
[3] Crude viscous oil after removal of chloroform crystallizes on triturating with ether.

Using the above procedure but employing other 4-haloquinolines and other arylacetonitriles, corresponding alpha-aryl-alpha-(4-quinolyl)-acetonitriles are formed. For example the following products are formed using the appropriate starting materials: alpha-(4-chlorophenyl)-alpha-(6,8-dichloro-4-quinolyl)acetonitrile, alpha-(3,4-dichlorophenyl) - alpha - ( 3- nitro - 4 - quinolyl)acetonitrile, alpha-(4-methoxyphenyl)-alpha-(6-methoxy-4-quinolyl)acetonitrile, and the like.

The alpha-aryl-alpha-(4-quinolyl)acetonitriles hereinabove described are further disclosed and claimed in our copending application Serial No. 29,938, filed May 28, 1948, now U. S. Patent 2,519,411, issued August 22, 1950.

II. Alpha-aryl-alpha-(4-quinolyl) acetamides

The alpha-aryl-alpha-(4-quinolyl) acetamides designated as IV in Chart I are prepared by hydrolyzing the corresponding disubstituted-acetonitriles under various sets of reaction conditions.

Excellent yields of these amides are obtained by hydrolysis of the corresponding nitriles with concentrated sulfuric acid at room temperature: One part by weight of the alpha-aryl-alpha-(4-quinolyl) acetonitrile is dissolved in four volumes of concentrated sulfuric acid, and after standing overnight at room temperature the solution is poured onto ice containing an excess of ammonium hydroxide. The solid amides are obtained in quantitative yields. Recrystallization from lower alkanols gives white crystalline solids.

These alpha - aryl - alpha - (4-quinolyl) acetamides also can be prepared in good yields by alkaline hydrolysis of the corresponding acetonitriles, as illustrated by the following specific example: A mixture of 5 g. of alpha-phenyl-alpha-(7-chloro-4-quinolyl) acetonitrile, 5 g. of pellet sodium hydroxide, and 40 ml. of 75% ethanol is refluxed for six hours. As the reaction proceeds the deep blood red solution becomes almost colorless and a solid separates in the form of pale pink needles; yield, 4.6 g. Treatment of this material with dilute hydrochloric acid gives a white amorphous solid which is alpha-phenyl-alpha-(7-chloro-4-quinolyl)-acetamide.

Quantitative yields of these di-substituted-acetamides are also obtained by refluxing the corresponding nitriles for seven hours with aqueous potassium hydroxide. In this procedure no intermediate salts are isolated.

The amides are also formed by the following procedure as illustrated by the following specific preparation: Dry hydrogen chloride is passed into an ice-cooled solution of 5 g. of alpha-phenyl - alpha - (7 - chloro - 4 - quinolyl) - acetonitrile in 50 ml. of dry chloroform containing 2 ml. of absolute ethanol. The color of the solution changes from a light orange to a deep red and finally to a pale yellow color. After about 20 minutes the reaction flask is fitted with a drying tube and allowed to stand at room temperature for three days. Thereby is obtained 6 g. of the white crystalline solid, alpha-phenyl-alpha-(7-chloro-4-quinolyl) acetamide. An analytical sample recrystallized from butanol melts at 283–284° C. with decomposition.

Still another method for preparing these amides is illustrated by the following specific preparation: A suspension of 5 g. of alpha-phenyl - alpha - (7 - chloro - 4 - quinolyl) - acetonitrile in 20 ml. of absolute methanol is treated with a stream of hydrogen chloride for six hours without external cooling. After a short time dissolution occurs and the hydrochloride of the starting acetonitrile separates to form a thick mass. This gradually redissolves, however before complete dissolution occurs, another solid begins to separate. After six hours of reaction time, the mixture is poured onto ice and neutralized with sodium bicarbonate solution, yielding 5.6 g. of alpha-phenyl-alpha-(7-chloro-4-quinolyl)-acetamide, M. P. 280° C. with decomposition. An analytical sample recrystallized from butanol melts at 283–284° C. with decomposition.

Other amides prepared in the above manner include: alpha-phenyl-alpha-(5-chloro-4-quinolyl) acetamide, M. P. 212–213° C. (from ethanol); alpha-phenyl-alpha-(4-quinolyl) acetamide, M. P. 267–268° C. (from butanol); alpha-(4-chlorophenyl) - alpha - (6,8 - dichloro - 4 - quinolyl) - acetamide; alpha-(3,4-dichlorophenyl)-alpha-(3-nitro-4-quinolyl) acetamide; alpha-(4-methoxy - phenyl) - alpha - (6 - methoxy - 4 - quinolyl) acetamide; and the like.

III. Lower alkyl alpha-aryl-alpha-(4-quinolyl)-acetates

These esters designated as V in Chart I are prepared from either the corresponding nitriles described in section I or the corresponding amides described in section II.

From the nitriles the esters can be produced by using hydrogen chloride in aqueous-alcoholic media at lower temperatures. The following procedure for compounds where the alpha-aryl group is phenyl is illustrative: A solution of one part by volume of water in 3 parts by volume of methanol is saturated with gaseous hydrogen chloride with strong external cooling. The ice bath is removed and one part by weight of an alpha-phenyl-alpha-(4-quinolyl) acetonitrile added at 10–15° C. As the addition of hydrogen chloride is continued the temperature rises to 35° C. and the solid soon dissolves completely to form a clear yellow solution. When the 4-quinolyl group is 7-chloro-4-quinolyl, the white hydrochloride of alpha-phenyl-alpha-(7-chloro-4-quinolyl) acetonitrile soon separates and gradually redissolves over a period of about two hours. The hydrogen chloride is bubbled slowly through the solution for a total of five or six hours. The resulting solution is stoppered and allowed to stand for varying amounts of time at room temperature. As ester formation occurs ammonium chloride separates. The time required for the first appearance of this salt serves as a rough guide of the rate of esterification. The time required for the appearance of ammonium chloride for different starting alpha-phenyl-alpha-(4-quinolyl)-acetonitriles are as follows: 2–3 hours where the 4-quinolyl radical is 4-quinolyl; 10–12 hours, where 7-chloro-4-quinolyl; and about one week, where 5-chloro-4-quinolyl. The reaction mixture is worked up by pouring into ice water and liberating the ester with aqueous sodium hydroxide in the presence of chloroform, care being taken to keep the solution cooled by the addition of ice. Filtration at this point removes most of the amide present. The chloroform layer is separated and dried with anhydrous calcium sulfate. Evaporation of the chloroform yields the desired ester. The crude product is freed from small amounts of the corresponding amide present by dissolving in hot petroleum ether, filtering with charcoal, seeding, and allowing to cool. The esters are recrystallized from an appropriate solvent such as petroleum ether or an alkanol to give white crystalline solids. The melting points of the resulting purified methyl alpha-phenyl-alpha-(4-quinolyl) acetates are as follows: Where the 4-quinolyl radical is 4-quinolyl, 60–62.2° C. (corr.; from petroleum ether); where 5-chloro-4-quinolyl, 115.4–116.6° C. (corr.; from methanol); and where 7-chloro-4-quinolyl, 129.4–131° C. (corr.; from petroleum ether).

The crude yields of methyl alpha-phenyl-alpha-(4-quinolyl) acetates are: Where the 4-quinolyl group is 4-quinolyl, 90% after standing seventeen days; where 7-chloro-4-quinolyl, 40% after three days and 70% after two weeks; where 5-chloro-4-quinolyl, 56% after five weeks (yield after recrystallization from n-heptane).

The corresponding ethyl esters are prepared when ethanol is substituted for methanol in the above procedure. For example, the yield of ethyl alpha-phenyl-alpha-(7-chloro-4-quinolyl) phenylacetate, after the reaction mixture stands for three days, is 54%, and the melting point is 127.4–128.4° C. (corr.; from petroleum ether). Other lower alkyl esters are formed when the above procedure is followed but using other lower alkanols in place of methanol. For example, when the alkanol is n-butanol and the starting nitrile is alpha-phenyl-alpha-(7-chloro-4-quinolyl) acetonitrile, the resulting ester is n-butyl alpha-phenyl-alpha-(7-chloro-4-quinolyl) acetate.

Other esters prepared according to the above procedure include: methyl alpha-(4-chlorophenyl)-alpha-(6,8-dichloro-4-quinolyl) acetate; methyl alpha-(3,4-dichlorophenyl)-alpha-(3-nitro-4-quinolyl) acetate; ethyl alpha-(4-methoxyphenyl)-alpha-(6-methoxy-4-quinolyl) acetate; and the like.

These intermediate lower alkyl alpha-aryl-(4-quinolyl) acetates also are prepared by hydrolyzing the corresponding amides under the same reaction conditions described above in the hydrolysis of the corresponding nitriles. As illustrative, methyl alpha-phenyl-alpha-(7-chloro-4-quinolyl) acetate is prepared from alpha-phenyl-alpha-(7-chloro-4-quinolyl) acetamide using the same procedure outlined above in the hydrolysis of the corresponding nitrile. The yield of the crude ester, after the reaction mixture has stood for three weeks, is 56%, or lower than that obtained from the nitrile. The yield is lower probably because the amide fails to dissolve completely under the reaction conditions.

IV. *Tertiary-aminoalkyl alpha-aryl-alpha-(4-quinolyl) acetates and salts thereof*

The lower aliphatic tertiary-aminolkayl alpha-aryl-alpha-(4-quinolyl) acetates designated as VI in Chart I are prepared by treating a corresponding lower alkyl ester with a lower aliphatic tertiary-aminoalkanol. The following procedure is illustrative: A mixture of 15 g. of methyl alpha-phenyl-alpha-(7-chloro-4-quinolyl) acetate, 30 ml. of 2-diethylaminoethanol, 110 ml. of petroleum ether (mixed octanes), and a small piece of freshly cut sodium about the size of a grain of wheat was placed in 500 ml. round-bottom flask, fitted with a continuous separator, refluxing condenser, and a drying tube. The mixture is refluxed (16–24 hours) at a rate just sufficient to allow the methanol formed in the reaction to distill over into the continuous separator. The cool reaction mixture is diluted with an equal volume of ether and extracted with dilute aqueous hydrochloric acid. The extract is made just alkaline to litmus with 10% sodium hydroxide solution and extracted with ether to remove any unchanged ester together with the small amount of the 4-benzylquinoline formed due to the reaction of the sodium alkoxide present. The aqueous layer is made alkaline to phenolphthalein with sodium hydroxide solution and extracted with ether. The ether extract is dried with anhydrous calcium sulfate, and the solvent removed by distillation, yielding 16.4 g. (86%) of 2-diethylaminoethyl alpha-phenyl-alpha-(7-chloro-4-quinolyl) acetate.

The condensation described in the previous paragraph can be carried out in the absence of sodium, but with a sacrifice in yield (39%).

The free basic esters are light orange-yellow oils, which recompose on distillation. The monohydrochlorides of these compounds are readily obtained by dissoving the bases in three volumes of acetone or isopropanol, adding slightly less than the calculated amount of alcoholic hydrogen chloride, diluting with ether just to turbidity, and scratching or seeding to start crystal formation. Where necessary, the hydrochlorides are recrystallized from isopropanol or acetone. These hydrochlorides are stable white crystalline substances easily soluble in water. Salts prepared in such a manner include: 2-diethylaminoethyl alpha-phenyl-alpha-(4-quinolyl) acetate hydrochloride, M. P. 136–138.5° C. (corr.); 2-diethylaminoethyl alpha-phenyl-alpha-(5-chloro-4-quinolyl) acetate hydrochloride, M. P. 178.3–179.8° C. (corr.); and 2-diethylaminoethyl alpha-phenyl-alpha-(7-chloro-4-quinolyl) acetate hydrochloride, M. P. 159.6–160.6° C. (corr.).

Other basic esters are prepared by the above procedure using other tertiary-aminolkanols and other lower alkyl alpha-aryl-alpha-(4-quinolyl)-acetates. Such esters include: 3-(1-piperidyl) propyl alpha-(4-chlorophenyl)-alpha-6,8-dichloro-4-quinolyl) acetate; 5-diethylamino-2-pentyl alpha-(3,4-dichlorophenyl)-alpha-(3-nitro-4-quinolyl) acetate; 2-(4-morpholinyl)-ethyl alpha-(4-methoxyphenyl)-alpha-(6-methoxy-4-quinolyl) acetate; and the like.

V. *N-(tertiary-aminoalkyl)-alpha-aryl-alpha-(4-quinolyl) acetamides and salts thereof*

These basic amides designated as VII in Chart I are prepared by the same procedure described under section IV for the related basic esters, but using lower aliphatic tertiary-aminoalkylamines instead of tertiary-aminoalkanols. When the condensations are run in the presence of a trace of sodium, the yields are low, being about 6%. Without the catalyst the yields run higher, ranging from 20 to 25%. The yields are much higher (about 65%) when an excess of a given lower aliphatic tertiary-aminoalkylamine is used. The products are crystallized from petroleum ether to give white crystalline solids. The mono-hydrochlorides are prepared by the addition of slightly less than the equivalent of alcoholic hydrogen chloride to an isopropanol or acetone solution of the base.

Using 2-diethylaminoethylamine in the above procedure, the following N-(2-diethylaminoethyl)-alpha-phenyl-alpha-(4-quinolyl) acetamides and hydrochlorides thereof are formed: Where the 4-quinolyl radical is 4-quinolyl, M. P. of base, 118.6–119.6° C. (corr.) and M. P. of HCl salt, 110–112° C.; where 5-chloro-4-quinolyl, M. P. of base, 92–93° C. and M. P. of HCl salt, 99.5–101° C.; and where 7-chloro-4-quinolyl, M. P. of base, 134.6–135.4° C. (corr.) and M. P. of HCl salt, 158–159.2° C. (corr.).

Using other lower aliphatic tertiary-aminoalkylamines and other lower alkyl alpha-aryl-alpha-(4-quinolyl) acetates in the above procedure the following basic amides are formed: N-(3-(1-piperidyl) propyl)-alpha-(4-chlorophenyl)-alpha-(6,8-dichloro-4-quinolyl) acetamide; N-(5-diethylamino-2-pentyl)-alpha-(3,4-dichlorophenyl)-alpha-(3-nitro-4-quinolyl)-acetamide; N-(2-(4-morpholinyl) ethyl)-alpha-(4-methoxyphenyl)-alpha-(6-methoxy-4-quinolyl) acetamide; N-methyl-N-(2-diethylaminoethyl)-alpha-phenyl-alpha-(7-chloro-4-quinolyl) acetamide; and the like.

VI. 4-arylmethylquinolines

These 4-substituted-quinolines are prepared by treating under various conditions the related alpha-aryl- alpha- (4- quinolyl)acetonitriles. Illustrative of these reaction conditions are the following procedures: Five parts by weight of an alpha- aryl- alpha- (4- quinolyl)acetonitrile and eight parts by volume each of concentrated sulfuric acid and water are refluxed vigorously for one hour. Initially, carbon dioxide evolves in copious amounts. At the end of the heating period, the yellow solution is poured into a mixture of ice and excess ammonium hydroxide. The product which separates is taken up in a solvent such as ether, the extract dried over anhydrous calcium sulfate, and the solvent distilled to give a quantitative yield of pale yellow oil which solidifies on standing. Recrystallization from petroleum ether gives the purified crystalline 4-arylmethylquinoline.

In another, and specific, preparation a solution of 5 g. of alpha - phenyl - alpha - (7 - chloro - 4-quinolyl)acetonitrile, 8 ml. of concentrated sulfuric acid, 2 ml. of water, and 15 ml. of methanol is refluxed for 22 hours on a steam bath. Working up of the reaction mixture as described in the preceding paragraph yields a quantitative yield of the crude 7-chloro-4-benzylquinoline, which when recrystallized from petroleum ether, melts at 93.5–94° C.

Another means of preparing the 4-arylmethylquinolines of our invention is illustrated by the following preparation of 7 - chloro - 4 - benzylquinoline: Hydrogen chloride is passed for eight hours into a refluxing solution of 5 g. of alpha-phenyl - alpha - (7 - chloro - 4 - quinolyl) acetonitrile dissolved in 50 ml. of absolue ethanol. The solution is filtered while hot to remove the ammonium chloride which has separated, the filtrate cooled, 20 ml. of ether added, and after standing two days the white solid which separates is filtered. The product obtained is 4 g. of impure 7-chloro-4-benzylquinoline hydrochloride, M. P. 218–220° C. (with decomposition), the structure of which is confirmed by converting into the corresponding 7-chloro-4-benzylquinoline, which has properties identical with the compound the preparation of which was described in the previous paragraph.

Other 4-benzylquinolines prepared according to the above procedures from the related alpha-phenyl - alpha - (4 - quinolyl)acetonitrile include: 4-benzylquinoline, M. P. 52–52.5° C. and mono-sulfate salt thereof, M. P. 195–196° C.; 5-chloro-4-benzylquinoline, M. P. 48.6–49.2° C. (corr.).

Using other alpha-aryl-alpha-(4-quinolyl)-acetonitriles in the above procedures the following 4-arylmethylquinolines are obtained: 6,8-dichloro - 4 - (4 - chlorophenyl)methylquinoline; 3 - nitro - 4 - (3,4 - dichlorophenyl) - methylquinoline; 6 - methoxy - 4 - (4 - methoxyphenyl) methylquinoline; and the like.

The above illustrated process of preparing 4-arylmethylquinolines of the formula QCH₂A by heating the corresponding alpha-aryl-alpha-(4-quinolyl)acetonitriles in an acidic medium and some of the 4-arylmethyl-halogenated-quinolines obtained thereby are disclosed and claimed in our copending continuation application, Serial No. 231,672, filed June 14, 1951.

Quaternary derivatives of these 4-arylmethylquinolines are prepared by the following method, which is similar to the general method described by Alekseeva (J. Gen. Chem. (U. S. S. R.), 10, 263 (1940); cf. C. A. 34, 7291 (1940)); 7-chloro-4-benzylquinoline is treated with a thirty percent excess of dimethyl sulfate and the mixture warmed on a steam bath. The resulting viscous yellow oil is dissolved in an equal volume of water and an excess of a 50% potassium iodide solution added. The yellow solid which forms is filtered off and dried in a vacuum desiccator. The product, obtained in quantitative yield, is recrystallized by stirring in 35 volumes of hot absolute ethanol followed by ice-cooling to give golden leaflets of 7-chloro-4-benzylquinoline methiodide, M. P. 229.2–230.6° C. (corr.) with decomposition. Prolonged contact with hot ethanol results in considerable decomposition of this quaternary salt.

4-Benzylquinoline methiodide obtained from alpha - phenyl - alpha - (4 - quinolyl)acetonitrile using the above procedure melts at 227–230° C. (corr.) with decompositioon (Rabe and Pasternack, Ber. 46, 1029 (1913), reported 226° C. with decomposition).

We claim:

1. A basic compound of the formula

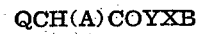

where Q is a 4-quinolyl radical, A is an aryl radical of the benzene series, Y is a member of the group consisting of O, NH and N-(lower alkyl), X is a lower alkylene radical, and B is a lower aliphatic tertiary-amino radical, and addition salts thereof.

2. A basic ester of the formula

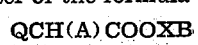

where Q is a 4-quinolyl radical, A is an aryl radical of the benzene series, X is a lower alkylene radical, and B is a lower aliphatic tertiary-amino radical, and addition salts thereof.

3. A basic amide of the formula

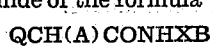

where Q is a 4-quinolyl radical, A is an aryl radical of the benzene series, X is a lower alkylene radical, and B is a lower aliphatic tertiary-amino radical, and addition salts thereof.

4. A basic ester of the formula

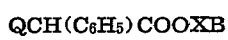

where Q is a 4-quinolyl radical, X is a lower alkylene radical, and B is a lower aliphatic tertiary-amino radical, and addition salts thereof.

5. A basic amide of the formula

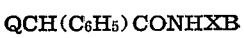

where Q is a 4-quinolyl radical, X is a lower alkylene radical, and B is a lower aliphatic tertiary-amino radical, and addition salts thereof.

6. A process for preparing a basic compound of the formula

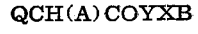

where Q is a 4-quinolyl radical, A is an aryl radical of the benzene series, Y is a member of the group consisting of O, NH, and N-(lower alkyl), X is a lower alkylene radical, and B is a lower aliphatic tertiary-amino radical, which comprises reacting a lower alkyl ester of the formula

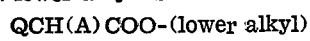

with a basic compound of the formula BXYH, where Q, A, B, X and Y have the meanings given hereinabove.

7. A process for preparing a basic ester of the formula

where Q is a 4-quinolyl radical, A is an aryl radical of the benzene series, X is a lower alkylene radical, and B is a lower aliphatic tertiary-amino radical, which comprises reacting a lower alkyl ester of the formula QCH(A)COO-(lower alkyl) with a basic alkanol of the formula BXOH, where Q, A, B and X have the meanings given hereinabove.

8. A process for preparing a basic amide of the formula

QCH(A)CONHXB where Q is a 4-quinolyl radical, A is an aryl radical of the benzene series, X is a lower alkylene radical, and B is a lower aliphatic tertiary-amino radical, which comprises reacting a lower alkyl ester of the formula QCH(A)COO-(lower alkyl) with a basic alkylamine of the formula BXNH₂, where Q, A, B and X have the meanings given hereinabove.

9. A process for preparing a basic ester of the formula

QCH(C₆H₅)COOXB where Q is a 4-quinolyl radical, X is a lower alkylene radical, and B is a lower aliphatic tertiary-amino radical, which comprises reacting a lower alkyl ester of the formula QCH(C₆H₅)COO-(lower alkyl) with a basic alkanol of the formula BXOH, where Q, B and X have the meanings given hereinabove.

10. A process for preparing a basic amide of the formula

QCH(C₆H₅)CONHXB where Q is a 4-quinolyl radical, X is a lower alkylene radical, and B is a lower aliphatic tertiary-amino radical, which comprises reacting a lower alkyl ester of the formula QCH(C₆H₅)COO-(lower alkyl) with a basic alkylamine of the formula BXNH₂, where Q, B, X and Y have the meanings given hereinabove.

11. 2-diethylaminoethyl alpha - phenyl - alpha-(7-chloro-4-quinolyl)acetate, and addition salts thereof.

12. 2-diethylaminoethyl alpha - phenyl - alpha-(5-chloro-4-quinolyl)acetate, and addition salts thereof.

13. 2-diethylaminoethyl alpha - phenyl - alpha-(4-quinolyl)acetate, and addition salts thereof.

14. N-(2-diethylaminoethyl) - alpha - phenyl-alpha-(7-chloro-4-quinolyl)acetamide, and addition salts thereof.

15. N-(2-diethylaminoethyl) - alpha - phenyl-alpha-(5-chloro-4-quinolyl)acetamide, and addition salts thereof.

16. A process for preparing 2-diethylaminoethyl alpha-phenyl-alpha-(7-chloro-4-quinolyl)-acetate which comprises reacting a lower alkyl alpha-phenyl-alpha-(7-chloro-4-quinolyl) acetate with 2-diethylaminoethanol.

17. A process for preparing 2-diethylaminoethyl alpha-phenyl-alpha-(5-chloro-4-quinolyl)acetate which comprises reacting a lower alkyl alpha-phenyl-alpha-(5-chloro-4-quinolyl)acetate with diethylaminoethanol.

18. A process for preparing 2-diethylaminoethyl alpha - phenyl - alpha-(4-quinolyl)acetate which comprises reacting a lower alkyl alpha-phenyl-alpha-(4-quinolyl)acetate with 2-diethylaminoethanol.

19. A process for preparing N-(2-diethylaminoethyl)-alpha-phenyl - alpha-(7-chloro-4-quinolyl)acetamide which comprises reacting a lower alkyl alpha-phenyl-alpha-(7-chloro-4-quinolyl)-acetate with 2-diethylaminoethylamine.

20. A process for preparing N-(2-diethylaminoethyl)-alpha-phenyl - alpha-(5-chloro-4-quinolyl)acetamide which comprises reacting a lower alkyl alpha-phenyl-alpha-(5-chloro-4-quinolyl)-acetate with 2-diethylaminoethylamine.

ALEXANDER R. SURREY.
ROYAL A. CUTLER.

No references cited.